(12) United States Patent
Dennison et al.

(10) Patent No.: US 10,325,249 B2
(45) Date of Patent: Jun. 18, 2019

(54) ONE BILL DATE ON A GRAPHICAL USER INTERFACE

(71) Applicant: PAYPAL, Inc., San Jose, CA (US)

(72) Inventors: Matthew Parker Dennison, San Jose, CA (US); Hisham Ibrahim, San Jose, CA (US); Michael Reiss, San Jose, CA (US); Maria Doherty, San Jose, CA (US); Erin Riedl, San Jose, CA (US); Sandeep Bhimavarapu, San Jose, CA (US); Hester Seth, San Jose, CA (US); Marisa Johnson, San Jose, CA (US)

(73) Assignee: PayPal, Inc., San Jose, CA (US)

(*) Notice: Subject to any disclaimer, the term of this patent is extended or adjusted under 35 U.S.C. 154(b) by 260 days.

(21) Appl. No.: 15/242,445

(22) Filed: Aug. 19, 2016

(65) Prior Publication Data

US 2017/0053254 A1 Feb. 23, 2017

Related U.S. Application Data

(60) Provisional application No. 62/208,494, filed on Aug. 21, 2015.

(51) Int. Cl.
*G06Q 40/00* (2012.01)
*G06Q 20/14* (2012.01)
*G06F 3/0482* (2013.01)
*G06Q 20/10* (2012.01)

(52) U.S. Cl.
CPC .......... *G06Q 20/14* (2013.01); *G06F 3/0482* (2013.01); *G06Q 20/102* (2013.01)

(58) Field of Classification Search
None
See application file for complete search history.

(56) References Cited

U.S. PATENT DOCUMENTS

| 2004/0083167 A1* | 4/2004 | Kight | G06Q 20/04 |
| | | | 705/40 |
| 2008/0091597 A1* | 4/2008 | Roach | G06Q 20/102 |
| | | | 705/40 |

* cited by examiner

*Primary Examiner* — Jason Borlinghaus
(74) *Attorney, Agent, or Firm* — Haynes and Boone, LLP

(57) ABSTRACT

Systems and methods that help ensure that assist a user with bill payment on a graphical user interface (GUI) are described. After receiving bill payment information from the user through the GUI, bill payments are aggregated over a given period of time, allowing a user to make a single payment to ensure that all appropriate bills and/or invoices are paid in a timely fashion. Through use of the GUI, a user can avoid the traditional hassle and stress of tracking and paying bills.

20 Claims, 5 Drawing Sheets

| PAYMENT DATE | STATUS | | |
|---|---|---|---|
| JUNE 18, 15 | PENDING | | ▶ |
| MAY 18, 15 | COMPLETE | | ▶ |
| | RENT | $650.00 | CONFIRMED |
| | UTILITIES | $150.00 | CONFIRMED |
| | ELECTRIC | $50.27 | CONFIRMED |
| | SAVINGS | $40.00 | CONFIRMED |
| APRIL 18, 15 | COMPLETE | | ▶ |
| MARCH 18, 15 | COMPLETE | | ▶ |

⊕ VIEW MODE

FIG. 3B

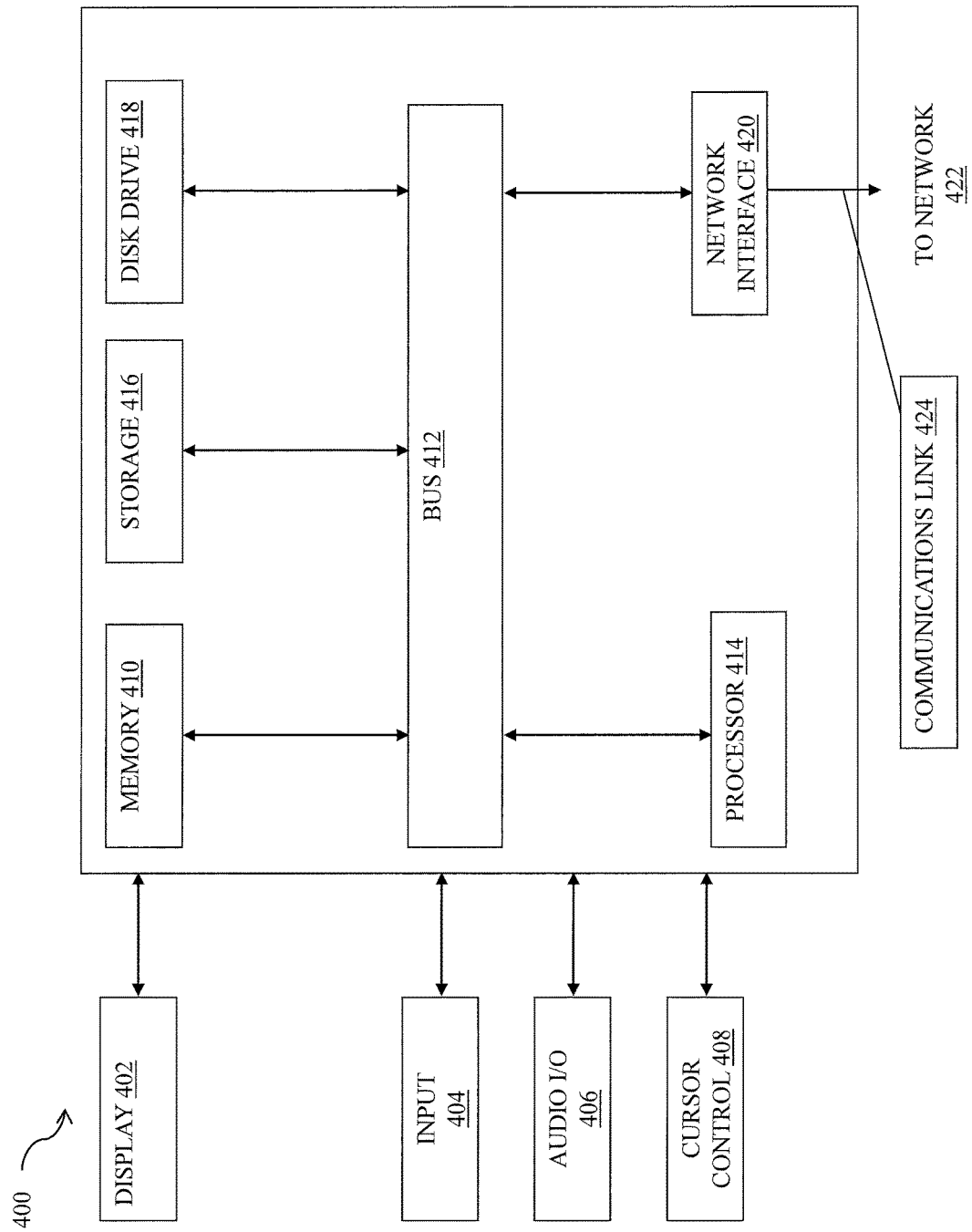

ical User Interface

ONE BILL DATE ON A GRAPHICAL USER INTERFACE

CROSS-REFERENCE TO RELATED APPLICATIONS

This application claims the benefit of U.S. Provisional Patent Application No. 62/208,494, filed Aug. 21, 2015, all of which is incorporated herein by reference in its entirety.

BACKGROUND

The present invention generally relates to providing a graphical user interface (GUI) that assists a user with electronic transactions, and more specifically, to intelligently aggregating transactions (e.g., fund transfers) over a given period of time for a user, thereby allowing a user to make a single transaction or payment to ensure that all appropriate bills and/or invoices are paid in a timely fashion.

Many individuals have a large number of bills that they have to manage and are forced to spend more and more time managing the payment of bills. As many people try to find more time in their lives, managing their bills can be an ever-increasing time commitment. Beyond the time commitment required to pay bills, vendors often impose late fees and/or penalties when an individual pays a bill late. Furthermore, in the event of a disputed bill, an individual may have difficulty in resolving the dispute with the vendor.

The prevailing online bill pay services are usually associated with a funded account to let users or payers make a scheduled payment by an indication as to who, when and how much to pay. Users need to sign up for an online bill pay service through the webpage of a financial institution. The bill pay services need to have payer-specific information that may include the payer's name, the funding account number and balance. The users need to type in receiver-specific information that may include the receiver's name, the amount, delivery date, and address. Users decide what dates and frequencies a payment gets made, either one time, or weekly, or monthly, or any other time schedule such as every 10 days.

These services, while perhaps avoiding some of the inconveniences of bill payment, do not address all of the problems with bill payment. For instance, with some banks, payments generally must be scheduled individually by the account holder, raising the same issues of possible missed payments, inconvenience in tracking amounts due and/or due dates. Moreover, such online bill payment services generally are unavailable to those who do not hold an account at a bank offering such services.

Accordingly, there is a need for improved bill payment services and methods.

BRIEF DESCRIPTION OF THE FIGURES

FIG. 3B is a webpage showing bill payment dates and their statuses according to an embodiment of the present disclosure; and FIG. 4 is a block diagram of a system for implementing one or more components in FIG. 1 according to an embodiment of the present disclosure.

Figure 1:
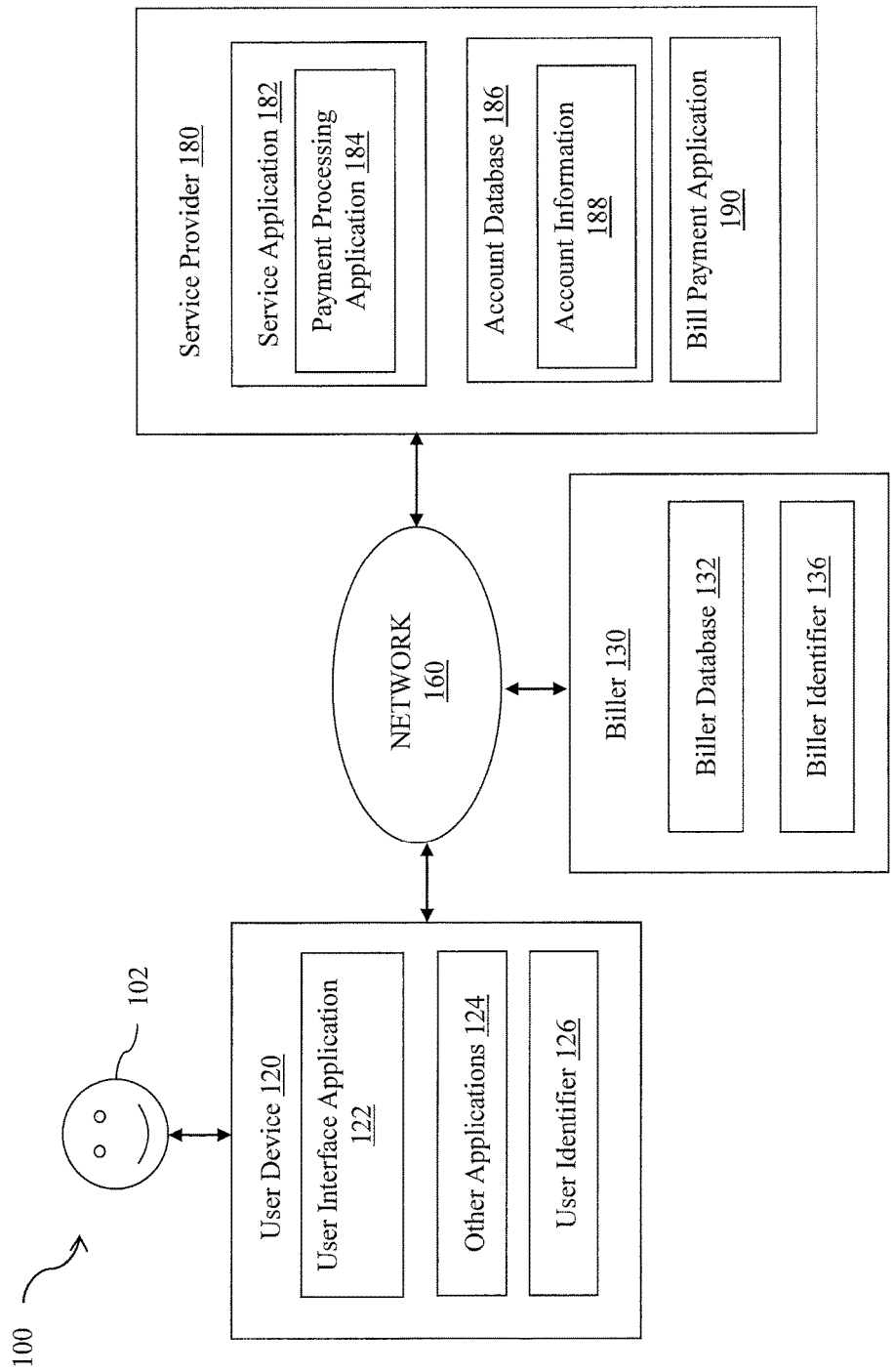
FIG. 1 is a block diagram illustrating a system of assisting a user with bill payment according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that provide an interactive GUI to assist a user with managing electronic transactions, and in particular with electronic bill payment by aggregating payments over a given period of time, allowing a user to make a single payment to ensure that all appropriate bills and/or invoices are paid in a timely fashion. The present systems and methods offer: (1) date aggregation of a consumer's bills so that the consumer pays the sum amount of all bills for the month on one date of the month; (2) execution of the billing to each biller such that bills are paid by the due date agreed to by the consumer; (3) ability to set the bill payment date; (4) ability to set the payment terms; and (5) ability of the consumer to pay for a bill separately from the one bill date. Advantageously, the present disclosure, through an interactive GUI, allows a user to avoid the traditional hassle and stress of tracking and paying bills, and frees up user time. Additionally, processing time required by payment service providers can be reduced because only a single payment is processed, as contrasted to multiple payments with conventional bill payment processing.

The present disclosure allows a service provider to track and/or pay bills on behalf of a user so that a user can see how much he or she really has to spend from a paycheck (e.g., the paycheck minus a certain amount for bills), assist the user in paying for unexpected expenses, and assist the user in saving money. According to various embodiments, the user shares his or her bills with the service provider through the interactive GUI (or the service provider receives bills on behalf of the user), and the service provider pays those bills, optionally after receiving confirmation from the user. In some embodiments, the user is not required to inform the service provider of specific bills to be paid. Instead, the user registers for a bill aggregation service and/or informs the service provider of the organizations or billers for which the user would like bills to be paid, and the service provider takes care of determining the amount to be paid, the due date, etc., and of paying the bills. Conveniently, rather than having to track and pay multiple bills each month (or other period), the user need interact only with the GUI of the service provider, saving the user significant time and/or expense. Advantageously, the present systems and methods minimize late fees and disruptions in service, minimize the chance of not having sufficient funds to pay for bills, minimize the cost of paying back borrowed money, and/or minimize the time it takes to save money.

FIG. 1 shows one embodiment of a block diagram of a network-based system 100 adapted to provide bill payment aggregation services using a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), a biller server or device 130, and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

User device 120, in various embodiments, may be implemented using any appropriate combination of hardware and/or software configured for wired and/or wireless communication over the network 160. User device 120, in one embodiment, may be utilized by the user 102 to interact with the service provider server 180 over the network 160. For example, the user 102 may conduct financial transactions (e.g., account transfers, bill payment, etc.) with the service provider server 180 via user device 120. In various implementations, user device 120 may include a wireless telephone (e.g., cellular or mobile phone), a tablet, a wearable computing device, a personal computer, a desktop computer, a notebook computer, and/or various other generally known types of wired and/or wireless computing devices.

User device 120, in one embodiment, includes a user interface application 122, which may be utilized by the user 102 to conduct transactions (e.g., shopping, purchasing, bidding, paying bills, etc.) with the biller device 130 or the service provider server 180 over the network 160. In one aspect, purchase expenses may be directly and/or automatically debited from an account related to the user 102 via the user interface application 122.

In one implementation, the user interface application 122 comprises a software program, such as a GUI, executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

User device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

User device 120, in one embodiment, may include at least one user identifier 126, which may be implemented, for example, as operating system registry entries, cookies associated with the user interface application 122, identifiers associated with hardware of user device 120, or various other appropriate identifiers. The user identifier 126 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

The one or more biller servers 130, in various embodiments, may be maintained by one or more billing entities that would normally submit bills and invoices to user 102 for payment. Examples of billing entities include public utilities, telecommunications providers, lenders (or other credit-extending organizations, which can include without limitation, mortgagees, auto lenders, educational lenders, personal lenders, etc.), charitable organizations, religious institutions, escrow companies, merchants (including without limitation merchants who receive payments on layaway items, etc.), financial institutions (which might receive payments for retirement accounts, savings accounts, educational savings accounts, brokerage accounts, etc.), and/or the like.

Each of the biller servers 130, in one embodiment, may include a biller database 132 for storing billing information of user 102 and at least one biller identifier 136. In one implementation, the biller identifier 136 may include one or more attributes and/or parameters related to the biller, such as account and address information. In various embodiments, user 102 may conduct transactions (e.g., searching, selection, monitoring, purchasing, paying bills, and/or providing payment for items) with each biller server 130 via the service provider server 180 over the network 160.

The service provider server 180, in one embodiment, may be maintained by a transaction processing entity, which may provide processing for financial transactions and/or information transactions between the user 102 and biller server 130. As such, the service provider server 180 includes a service application 182, which may be adapted to interact with the user device 120 and/or biller server over the network 160. In one example, the service provider server 180 may be provided by PayPal®, Inc. and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and biller accounts in an account database 186 each of which may include account information 188 associated with one or more individual users (e.g., user 102) and billing entities. For example, account information 188 may include private financial information of user 102, such as one or more account numbers, passwords, credit card information, banking information, or other types of financial information, which may be used to facilitate financial transactions between user 102 and a biller. In various aspects, the methods and systems described herein may be modified to accommodate users and/or billers that may or may not be associated with at least one existing user account and/or biller account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, the service provider server 180 includes bill payment application 190. Bill payment application 190 receives a bill payment date from a user, determines which bills need to be paid by the bill payment date, calculates and displays a consolidated amount of the bills that are due by the bill payment date, receives a selection of one or more payment methods for bill payment, and processes payment of the consolidated bill. In various embodiments, if user 102 changes the bill payment date, bill payment application 190 recalculates the consolidated amount of the bills based on the changed bill payment date. According to some implementations, if user 102 does not have sufficient funds to pay the consolidated amount on the bill payment date, the service provider offers the user 102 credit, and user 102 repays the service provider at a later date. In several embodiments, user 102 can set the payment terms (e.g., pay for the consolidated amount in weekly installments instead of in one lump monthly payment, pay using a combination of bank and credit cards, etc.). In some embodiments, the ability to the set the payment terms is based at least in part on a security, risk, or credit analysis of the user 102, such as based on historical transactions, payments, credit score, frequency and amount of deposits and withdrawals, and estimated upcoming deposits and withdrawals.

Figure 2:
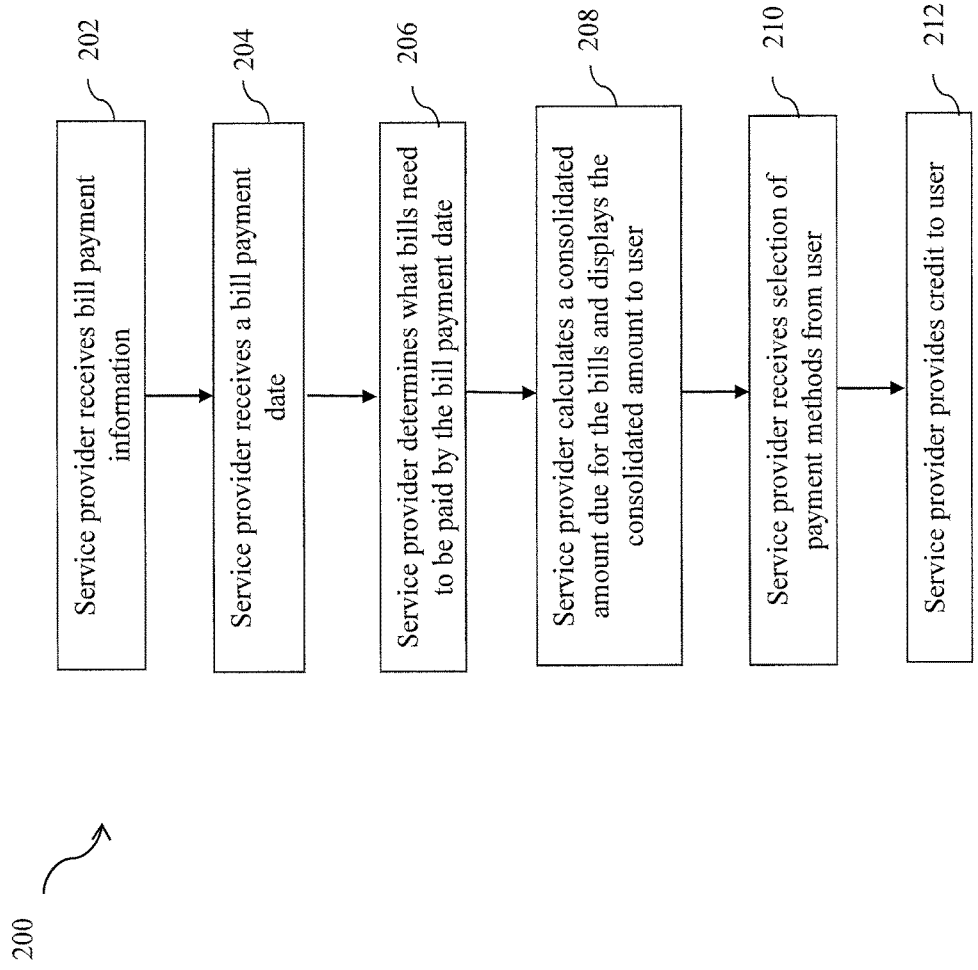
FIG. 2 is a flowchart showing a method of assisting a user with bill payment according to an embodiment of the present disclosure.

Referring now to FIG. 2, a flowchart 200 of a method of providing bill payment aggregation services to a user is illustrated according to an embodiment of the present disclosure.

At step 202, the service provider server 180 receives bill payment information from, for example, user 102 through an interactive GUI. In several embodiments, user 102 enrolls in the bill payment service offered by the service provider and identifies one or more billers for which the payment services should be performed (i.e., for which bills should be consolidated). The enrollment process typically includes receiving additional information from user 102, such as biographical information about the user 102, information identifying one or more accounts (e.g., a service provider account, or a bank or other financial institution account) from which funds should be obtained to make payments, etc. In one embodiment, enrolling in the bill payment service may include receiving any necessary authorizations from the user 102 (including without limitation, authorizations to represent the user as the payer of a bill, authorizations to electronically withdraw/deduct funds from an identified account, authorizations to link an identified account to a service provider account, authorizations to receive bills from identified billers, authorizations for payroll deductions, authorizations for direct deposit to a bill payment account, etc.). Other authorizations may include access to a user's calendar, social network, or other database that may contain data to enable the service provider to determine availability of funds, both in amount and time. For example, a user's calendar may show an upcoming vacation that will require use of significant funds.

According to some embodiments, the user 102 also provides billing information for each biller through the GUI. This billing information is received during enrollment in the bill payment service or separate from enrollment. In other cases, the information might be received from the billers themselves. Billing information can include payment details, such as preferred form of payment (e.g., checks vs. electronic transfer), a payment address, an account number and/or routing number for direct deposit, information on billing frequency, and/or information on billing amount.

In several embodiments, the biller includes a bank and the billing infoi nation includes savings account information for user 102. In this way, user 102 can set aside money to deposit in a savings account. In some embodiments, the service provider server 180 may suggest deferring a deposit in a savings account until there are more favorable conditions (e.g., higher interest rates expected).

At step 204, the user 102 provides through the interactive GUI and the service provider server 180 receives a bill payment date, i.e., a date that user 102 wants bills to be paid. This date can be changed anytime by user 102, and the changes in the amount due to be paid displayed to user 102. For example, if the bill payment date is selected to be August 15th, the bills that need to be paid may amount to $1000, but if the bill payment date is August $30^{th}$, the bill amount may change to $1500. In several embodiments, the service provider server 180 suggests a bill payment date to user 102, based on individual due dates, when late payment fees are required, dates that the user 102 is expected to be paid (e.g., regular paychecks or commission checks), etc. In one embodiment, the service provider server 180 minimizes the time between the date that user 102 is paid and the bill payment date, so that user 102 can have a more accurate view of how much money he or she has to spend after the bills are paid.

At step 206, the service provider server 180 determines which bills need to be paid by the bill payment date. "Need" to be paid bills may include payees that do not provide any grace period (resulting in late fees or shutoff of services or non-delivery of goods), would adversely affect the user's credit, or otherwise cause adverse effects more severe than non-payment of other bills. In one embodiment, user 102 identifies for the service provider one or more billers for which the user 102 would like to have payments made. The service provider server 180 can obtain information about payments due to those billers (e.g., by requesting that the billers notify the service provider about payments due) and makes the payments on behalf of the user 102, providing the user 102 with enhanced convenience.

Figure 3A:
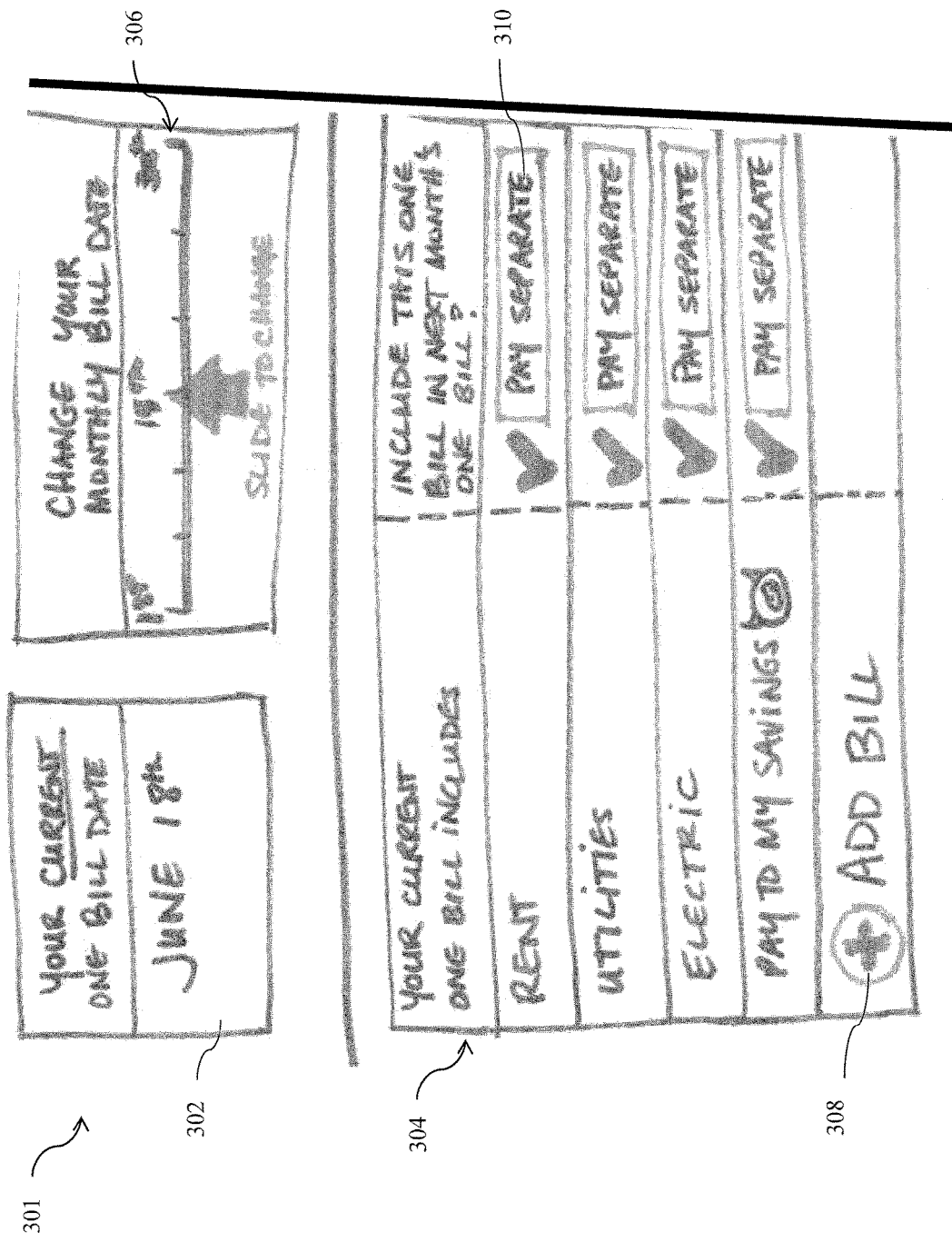
FIG. 3A is a webpage showing a bill payment date and bills according to an embodiment of the present disclosure.

FIG. 3A illustrates a webpage 301 that provides a bill payment date 302, along with bills 304 that will be paid by the bill payment date. The webpage 300 includes a mechanism 306 through which the user 102 can change the bill payment date. As shown, the user 102 can change the bill payment date 302 by sliding an arrow to the desired bill payment date. The user 102 can also add bills to be paid on the bill payment date 302 by pressing the "add bill" button 308 and/or choose to remove certain bills from next month's bill payment date by pressing a "pay separate" button 310.

The removed bills can be processed and paid separately by the service provider server 180.

According to various embodiments, the bill payment service is used for repeating payments, so that the user 102 does not need to keep track of monthly (or other periodic) bills from the billers. Instead, the amount(s) due and due date(s) are tracked automatically by the service provider, which generally receives funds from the user 102 and/or on behalf of the user 102 (e.g., from a trust fund, education IRA, 529 plan, 401(k) plan, social security (retirement and/or disability) disbursement, Medicare disbursement, Medicaid disbursement, etc.) and distributes the appropriate amount of funds to each biller. In another embodiment, the service provider server 180 pays the bills on behalf of user 102 and collects funds from the user 102 after the bills are paid.

In many cases, the bill payment services are used to make a number of payments to each biller over time. Advantageously, the payments do not need to be a constant amount. Because the amount due to a biller in a first period might be different from an amount due in a second period, the service provider server 180 can determine an amount due and/or due date each time a payment is to be made. The service provider server can also make constant periodic payments.

At step 208, the service provider server 180 calculates a consolidated amount due for the bills that need to be paid by the bill payment date and displays the consolidated amount to user 102, such as on the interactive GUI of user device 120. In embodiments where user 102 may not have sufficient funds to pay for the consolidated amount from his or her financial accounts or other payment methods, the service provider server 180 calculates how much the service provider needs to provide to user 102 before user 102 can pay the service provider and after user 102 can pay the service provider. The service provider can then send a notification to user 102 that he or she owes a first amount of money on a first date and a second amount of money on a second date.

In several embodiments, the service provider server 180 determines the amount due (and/or due date) without requiring any input from the user 102. Beneficially, this relieves the user 102 from having to undertake the inconvenience of notifying the service provider about bills each month. In another embodiment, however, the user 102 can indicate to the service provider (e.g., via the GUI), an amount due and/or due date.

In some embodiments, the service provider server 180 will receive from a biller a bill, either electronically and/or on paper, and the amount due can be determined from this bill. The bill may consist of the entire bill or may include only certain components of the bill (e.g., amount due and/or due date). The amount due generally will correspond to a particular biller, and also will include a billing identifier (such as an account number, etc.) for the user 102, as well as a due date, any or all of which may be provided on the bill. In the case of electronic billing, the service provider server 180 might receive data, e.g., via an interface, that allows the service provider server 180 to automatically determine the amount due, due date, associated billing identifier, etc.

In other embodiments, an agent or operator, or the user 102, might input the amount due and/or due date, the bill might be scanned and/or parsed to find an amount and/or date due, etc. In many cases, each biller will send a bill or other notification to service provider server 180.

Thus, in one embodiment, the method 200 might include receiving, from one or more billers a notification of an amount due and a due date. The amounts due to the various billers need not have the same due date. For amounts due with different due dates, the service provider server 180 may synchronize due dates so that user 120 can make a single payment for all amounts due in any given period. For example, the service provider server 180 may reach an agreement with each biller that all amounts due will share a common due date, or the service provider server 180 may determine the "best" date to pay the bills. For example, the service provider server 180 may review the user 102's upcoming expenses and/or expected income to determine an ideal date that a bill or bills should be paid. For instance, if the user 102 is going on vacation and will need more cash, then the service provider server 180 may choose a later date to pay the bills. On the other hand, if the user 102 will be paid in the next few days and the user 102 does not have any large upcoming expenses, the service provider server 180 may choose the date to be the day or two days after the user 102 is paid. In some cases, rather than collecting funds prior to the due dates, the service provider server 180 can advance funds to cover payment of amounts due and then receive funds from the user 102 on or after the due dates of all or a portion of the bills.

In some cases, the service provider server 180 provides notification to the user 102 of an amount due to each of the billers (either individually or collectively). The notification to the user 102 may include providing a consolidated statement to the user 102, informing the user 102 of the payments that will be made (or have already been made) and/or the amount of funds required from the user 102. In other cases, the service provider server 180 might obtain funds and/or make payments without any interaction with the user 102, depending on the preferences of the user 102. If a consolidated statement is provided, the consolidated statement might itemize the payments to be made over a given period (e.g., identifying the biller, amount due, due date, etc. for each payment), while in other cases, the consolidated statement might simply notify the user 102 of the total amount to be paid. In several embodiments, the billers are grouped according to a specific category (e.g., utilities, credit cards, etc.). Any number of varying levels of detail might be provided in the consolidated statement, and/or the user 102 may be given the option to select the level of detail desired in the consolidated statement.

In some cases, the consolidated statement may allow the user 102 to see the details (e.g., the entire bill) supporting an amount due from any biller. A consolidated statement may also provide details behind each line item or service bundle by including the details directly on or with the consolidated statement, by linking to a website maintained by or for the biller, or by including the details as an object or objects with the consolidated statement (e.g., embedded in a consolidated statement sent via e-mail). Various security measures may be employed for a user to retrieve the details, including without limitation, user names, passwords, biometrics (e.g., fingerprint, retinal scan, voiceprint, DNA, etc.), and/or encryption of any or all of the foregoing.

In various embodiments, the method 200 includes receiving confirmation from the user 102 that at least a portion or all of the consolidated statement should be paid (i.e., confirmation that at least a portion or all of at least some of the bills/payments to which the consolidated statement pertains should be paid), and/or instructions that one or more of the payments should not be made, either in part or in whole. The user 102 might be provided the option of individually approving/confirming each amount due to be paid. However, if the user 102 wants to approve all of the amounts due, the user 102 might be given the option to confirm payment of the consolidated statement (e.g., approve a consolidated payment amount), without having to individually approve payment of each amount due (e.g., each bill). Advantageously, user 102 can choose to pay one or more bills independent from the bill payment date. In other words, user 102 can remove one or more bills from the consolidated payment calculation.

FIG. 3B illustrates a webpage 303 providing an exemplary consolidated statement. The consolidated statement includes various bill payment dates 312 and their respective statuses 314. Should the user 102 desire more details on what bills were paid on certain bill payment dates, the user 102 can click on a status to view the bills that were paid and their amounts. The user 102 can select the "view more" button 316 to view more bill payment dates.

At step 210, the user 102 chooses and the service provider server 180 receives the user's selection of one or more payment methods or funding sources to pay the consolidated amount. Any suitable payment method may be used, including, for example, credit or gift cards, bank account, service provider account, payment via installments (e.g., weekly installments), etc. In some embodiments, restrictions on the type of payment method may be implemented (e.g., a credit card cannot be used to pay the balance on another credit card). In various embodiments, incentives, promotions, or offers associated with the different payment methods may be viewable by the user 102. For example, when user 102 hovers a cursor over a specific credit card, any points or rewards that can be earned with that credit card can be displayed.

At step 212, the service provider 180 provides credit to user 102. For example, user 102 may not have sufficient funds to pay for the bills, and the service provider server 180 pays all or a portion of the consolidated bill amount so that the individual billers are paid the appropriate amount. In several embodiments, the service provider server 180 takes into account the preferred method of payment for each biller. For example, a landlord may prefer a check to a credit card or electronic payment so the service provider sends a physical check to the landlord.

In some cases, the user 102 incurs an unexpected expense (e.g., a broken car, emergency operation, etc.) and does not have enough funds to pay for the bills. In other cases, the user 102 may have not have a steady income, and user 102 may not receive another paycheck until after the bill payment date. In this scenario, the service provider server 180 can suggest ways to spread the user 102's income over the period of time where he or she is not receiving a paycheck. For example, service provider server 180 may suggest that user 102 make smaller payments to a credit card, and once he or she receives a paycheck, to pay off the total balance of the credit card. Advantageously, the service provider provides flexibility to user 102, so that bill payment can be as convenient and hassle-free as possible.

In various embodiments, the service provider server 180 performs a security analysis on user 102 to ensure that funds advanced by the service provider are recoverable from the user 102. The service provider server 180, for instance, can determine the level of trustworthiness or a risk profile of the user 102. In one example, the service provider queries third party databases to access criminal records, financial information (e.g., credit score, credit history, bankruptcy, etc.), employment records, etc. The service provider server 180 can also examine its own database(s) to determine the reputation of the user 102, what kinds of financial transactions the user 102 has performed, how often the user 102 has used his or her account, the dollar amount on the financial transactions the user 102 has performed, the balance in the account of the user 102, ratings associated with the user 102, etc. The service provider server 180 can determine, after the security analysis, that the user 102 should not be advanced funds because the user 102 does not meet a minimum threshold of trustworthiness.

In some embodiments, the service provider 102 can determine how flexible the repayment terms are based on the security analysis. For example, a user with a good credit score and steady employment may have more flexibility in repaying service provider than a user with a bad credit score and unsteady employment. In addition, in one embodiment, should user 102 fail to repay the service provider, user 102 may no longer use the bill payment service offered by the service provider.

In any case, the service provider pays at least a portion of or the entire consolidated amount due to the billers (subject to any instruction from user 102 not to pay certain bills). In several embodiments, once the bills are paid, user 102 can view payment confirmations from the actual billers.

In an alternative embodiment, the service provider server 180 pays each biller out of funds received from user 102. The service provider server 180 can receive funds from user 102 sufficient to pay at least a portion or all of the bills. For example, the service provider server 180 may be authorized by the user 102 to obtain (via withdrawal, electronic funds transfer, electronic check, etc.) funds from a financial account of the user 102 so that service provider server 180 can perform an authorized withdrawal from the user's financial account. The user's account can be any account suitable for making payments, including without limitation, a bank account (e.g., checking, savings, CD, etc.), investment count, trust fund, 401(k), 529 account, Medicare account, Medicaid account, Social Security (retirement or disability) account, etc.

In various exemplary embodiments, service provider server 180 provides an interactive GUI (e.g., a webpage) where user 102 can input and view various information (e.g., details about one or more bills that are due) as shown in FIGS. 3A and 3B. A service provider web site might be configured to allow the user 102 to confirm that some or all of the payments should be made, and receiving confirmation from the user 102 therefore would include receiving confirmation via that web site.

FIG. 4 is a block diagram of a computer system 400 suitable for implementing one or more embodiments of the present disclosure, including the user device 120, the biller device or server 130, and the service provider server 180. In various implementations, the user device 120 may comprise a mobile cellular phone, personal computer (PC), laptop, desktop computer, etc. adapted for wireless communication, and the biller server or device 130 and service provider server 180 may comprise a network computing device, such as a server. Thus, it should be appreciated that the devices 120, 130, and 180 may be implemented as computer system 400 in a manner as follows.

Computer system 400 includes a bus 412 or other communication mechanism for communicating information data, signals, and information between various components of computer system 400. Components include an input/output (I/O) component 404 that processes a user (i.e., sender, recipient, service provider) action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). An optional audio input/ output component 406 may also be included to allow a user to use voice for inputting information by converting audio signals. Audio I/O component 406 may allow the user to hear audio. A transceiver or network interface 420 transmits and receives signals between computer system 400 and other devices, such as another user device, a biller server, or a service provider server via network 422. In one embodiment, the transmission is wireless, although other transmission mediums and methods may also be suitable. A processor 414, which can be a micro-controller, digital signal processor (DSP), or other processing component, processes these various signals, such as for display on computer system 400 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transitory transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system for assisting a user with bill payment on a graphical user interface (GUI) comprising:
    a non-transitory memory; and
    one or more hardware processors coupled to the non-transitory memory and configured to read instructions from the non-transitory memory to cause the system to perform operations comprising:
        receiving a set of authorizations for bill processing with a plurality of billers from a user through interactive fields of the GUI, wherein the set of authorizations comprise a first authorization to retrieve a plurality of bills from the plurality of billers and a second authorization to electronically access one or more payment methods for the bill processing with the plurality of billers;
        establishing a bill payment date with the plurality of billers;
        receiving the plurality of bills from the plurality of billers, wherein each of the plurality of bills comprise billing data;
        calculating a consolidated payment amount from the plurality of bills that are due by the bill payment date;
        consolidating the billing data into an interface of the GUI;
        causing to be displayed the consolidated payment amount and the billing data in the interface of the GUI, wherein the interface comprises an interactive option for a confirmation of the consolidated payment amount without requiring individual responses for each of the plurality of bills;
        in response to receiving the confirmation, electronically accessing the one or more payment methods;
        determining funds required by the user to cover at least a portion of payment of the consolidated payment amount based on the electronically accessing the one or more payment methods;
        determining a risk profile for a repayment of the funds by the user based on a past transaction history of the user, the one or more payment methods, and funding sources available to the user for the repayment of the funds; and processing a payment of the consolidated payment amount in part using the funds based on the risk profile.

2. The system of claim 1, wherein the one or more payment methods comprise installment payments.

3. The system of claim 1, wherein the operations further comprise receiving instructions from the user through the GUI to remove one of the plurality of bills from the consolidated payment amount.

4. The system of claim 1, wherein the operations further comprise receiving a second, different bill payment date from the user through the GUI.

5. The system of claim 4, wherein the operations further comprise recalculating the consolidated payment amount based on the second, different bill payment date.

6. The system of claim 1, wherein the operations further comprise suggesting a second, different bill payment date to the user on the GUI based on one or more of bill due dates, late payment fees, or dates that the user is expected to be paid.

7. The system of claim 6, wherein the suggested second, different bill payment date minimizes a time between a date that the user is expected to be paid and the second, different bill payment date.

8. The system of claim 1, wherein the operations further comprise collecting funds from the user prior to the bill payment date.

9. The system of claim 1, wherein the operations further comprise providing a notification to the user on the GUI of an amount due each biller from the plurality of billers.

10. The system of claim 9, wherein prior to the receiving the confirmation, the operations further comprise receiving a partial confirmation from the user through the GUI that a portion of the consolidated payment amount should be paid.

11. The system of claim 1, wherein the operations further comprise receiving the repayment of the funds from the user.

12. The system of claim 11, wherein the operations further comprise receiving repayment terms for the funds from the user through the GUI.

13. A method of assisting a user with bill payment on a graphical user interface (GUI) comprising:

receiving a set of authorizations for bill processing with a plurality of billers from a user through interactive fields of the GUI, wherein the set of authorizations comprise a first authorization to retrieve a plurality of bills from the plurality of billers and a second authorization to electronically access one or more payment methods for the bill processing with the plurality of billers;

establishing, by one or more processors of a service provider a bill payment date with the plurality of billers;

receiving the plurality of bills from the plurality of billers, wherein each of the plurality of bills comprise billing data;

calculating, by the one or more processors, a consolidated payment amount from the plurality of bills that are due by the bill payment date;

consolidating the billing data into an interface of the GUI, causing to be displayed, by the one or more processors, the consolidated payment amount and the billing data in the interface of the GUI, wherein the interface comprises an interactive option for a confirmation of the consolidated payment amount without requiring individual responses for each of the plurality of bills;

in response to receiving the confirmation, electronically accessing the one or more payment methods;

determining credit required by the user to cover at least a portion of payment of the consolidated payment amount based on the electronically accessing the one or more payment methods;

determining a risk profile for a repayment of the credit by the user based on a past transaction history of the user, the one or more payment methods, and funding sources available to the user for the repayment of the credit; and processing, by the one or more processors, a payment of the consolidated payment amount in part using the credit based on the risk profile.

14. The method of claim 13, further comprising receiving the repayment for the credit from the user.

15. The method of claim 14, wherein the repayment is received in installments or is paid using a combination of payment methods.

16. The method of claim 13, further comprising receiving a request to select one of the plurality of bills.

17. A non-transitory machine-readable medium having stored thereon machine-readable instructions executable to cause a machine to perform operations comprising:

receiving a set of authorizations for bill processing with a plurality of billers from a user through interactive fields of a graphical user interface (GUI), wherein the set of authorizations comprise a first authorization to retrieve a plurality of bills from the plurality of billers and a second authorization to electronically access one or more payment methods for the bill processing with the plurality of billers;

establishing a bill payment date with the plurality of billers;

receiving the plurality of bills from the plurality of billers, wherein each of the plurality of bills comprise billing data;

consolidating the billing data into an interface of the GUI;

calculating a consolidated payment amount from the plurality of bills that are due by the bill payment date;

causing to be displayed the consolidated payment amount and the billing data in the interface of the GUI, wherein the interface comprises an interactive option for a confirmation of the consolidated payment amount without requiring individual responses for each of the plurality of bills;

advancing funds to the user to cover at least a portion of the consolidated payment; and processing a payment of the consolidated payment amount using the funds based on a security analysis of the user.

18. The non-transitory machine-readable medium of claim 17, wherein the operations further comprise:

determining the security analysis for a repayment of the funds by the user.

19. The non-transitory machine-readable medium of claim 18, wherein the operations further comprise:

determining available funding sources for the repayment of the funds based on the security analysis.

20. The method of claim 13, further comprising:

displaying information for the one of the plurality of bills on the GUI separate from the billing data in the interface.

* * * * *